United States Patent [19]

Grimm et al.

[11] Patent Number: 4,482,183
[45] Date of Patent: Nov. 13, 1984

[54] WIND DEFLECTOR DEVICE AT AN AUTOMOBILE ROOF

[75] Inventors: Rainer Grimm, Wetzlar; Rudolf Roos, Maintal, both of Fed. Rep. of Germany

[73] Assignee: Rockwell Golde GmbH, Fed. Rep. of Germany

[21] Appl. No.: 419,332

[22] Filed: Sep. 17, 1982

[30] Foreign Application Priority Data

Sep. 18, 1981 [DE] Fed. Rep. of Germany ....... 3137191

[51] Int. Cl.$^3$ ............................................. B60J 7/22
[52] U.S. Cl. .................................................... 296/217
[58] Field of Search ............................... 296/217, 222

[56] References Cited

U.S. PATENT DOCUMENTS

| | | | |
|---|---|---|---|
| 3,874,723 | 4/1975 | Coenen | 296/217 |
| 4,142,759 | 3/1979 | Beinert | 296/217 |
| 4,362,332 | 12/1982 | Garnham | 296/217 |

Primary Examiner—Robert R. Song

[57] ABSTRACT

In a wind deflector device at an automobile roof comprising a roof opening (2) closable by a sliding lid (6), a wind deflector (18) pivotally disposed along the forward edge of the roof opening and two restoring levers (23) are provided, which are each journalled at one end of the roof frame (3) and at the other end engage with the wind deflector, the wind deflector being capable of pivoting out under spring force when the sliding lid opens and capable of pivoting in by the running of components connected with the sliding lid onto the restoring levers when the sliding lid is closed. To reduce the wind noise and air flow resistance, it is provided in this wind deflector device that a pivoting out spring (27), bearing against the roof frame, shall act under prestress on each restoring lever, while the wind deflector is connected with at least one displacement spring (28), which bears with prestress against the forward roof frame, causing the wind deflector, when pivoted out, to be displaced simultaneously until its forward edge comes to bear against the forward edge of the roof opening, optionally through the intermediary of a sealing profile (46), thus avoiding a gap between the forward zone of the roof and the wind deflector. The wind deflector device is constructed for simplified assembly by snap engagement of its constituent elements.

15 Claims, 6 Drawing Figures

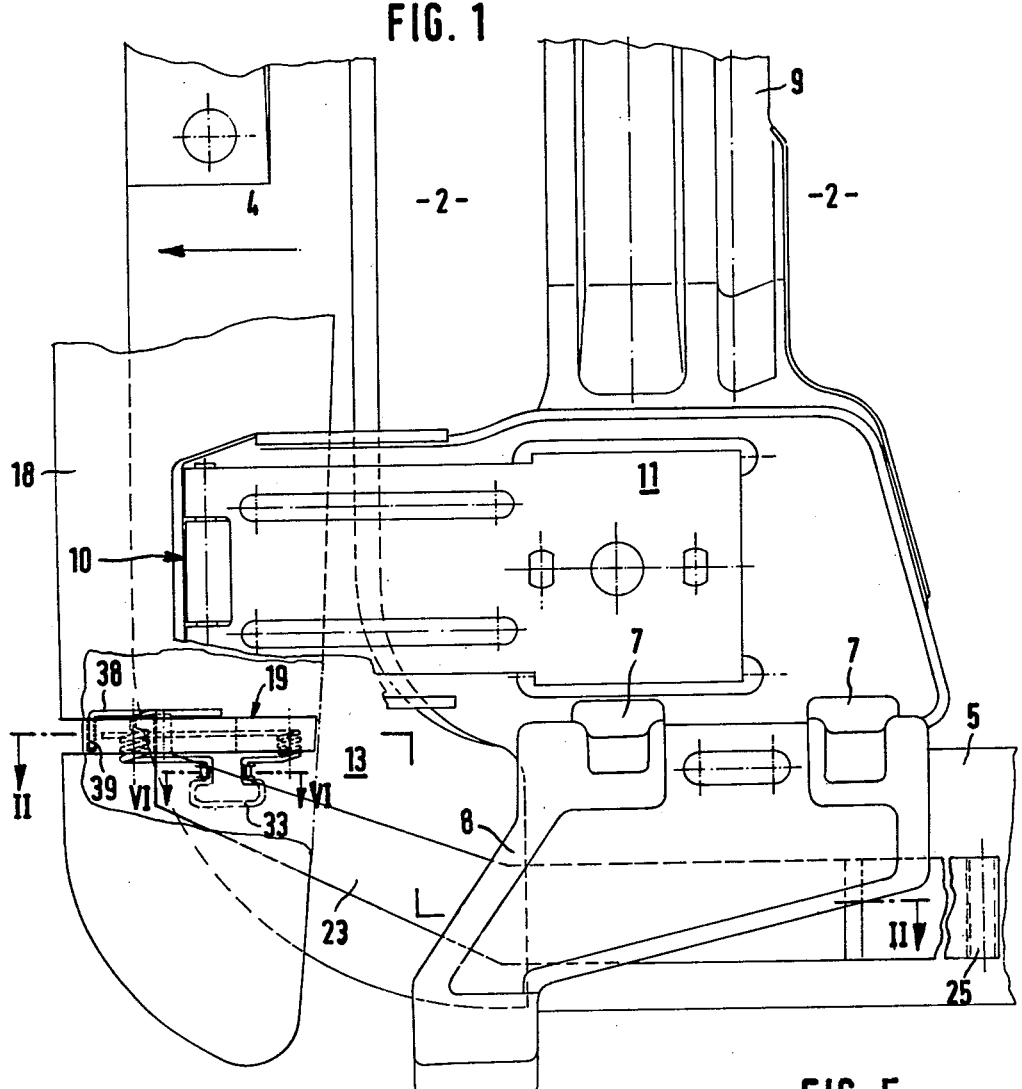
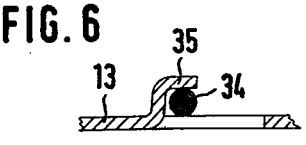
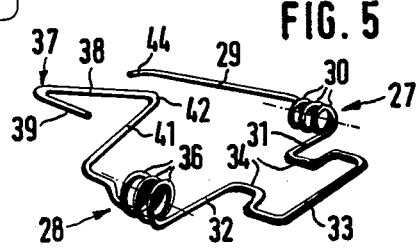

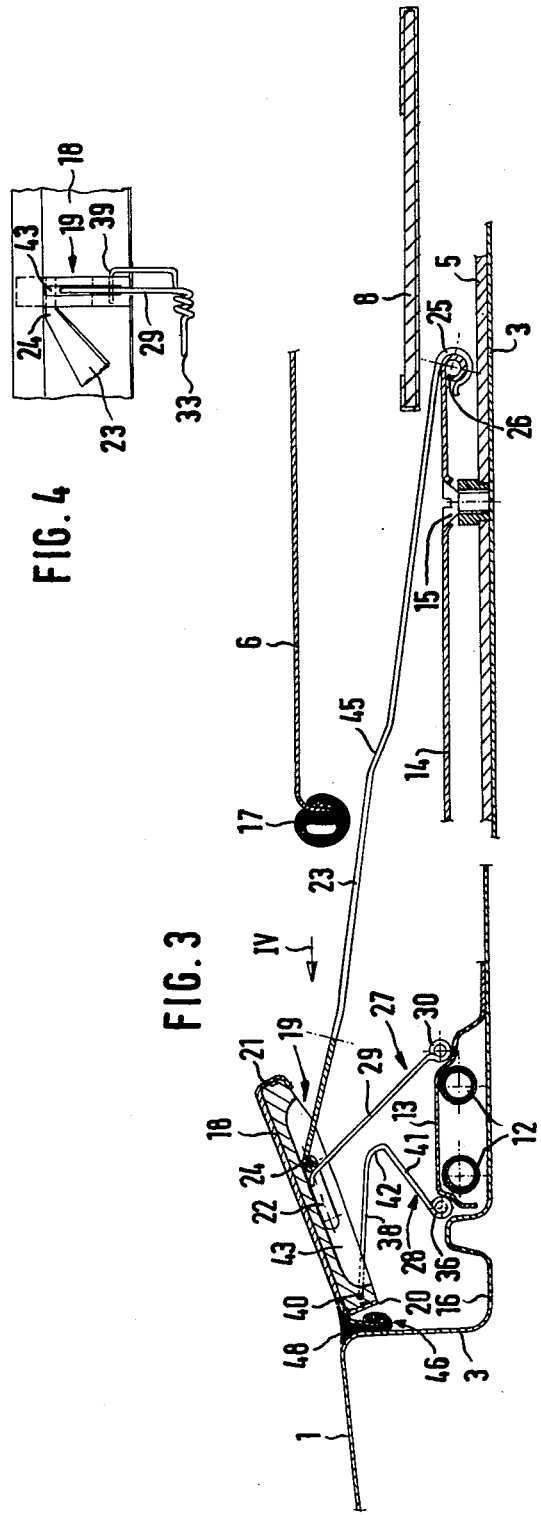

WIND DEFLECTOR DEVICE AT AN AUTOMOBILE ROOF

The invention relates to a wind deflector device at an automobile roof comprising a roof opening surrounded by a roof frame, which opening can be closed by a sliding lid guided laterally on guide rails of the roof frame, consisting essentially of a wind deflector pivotally disposed along the forward edge of the roof opening and of two restoring levers, which are each pivotally journalled with one end laterally on the roof frame and engage with the other end into an elongated hole situated on the wind deflector, the wind deflector being pivotal outwards by spring force when the sliding lid is opened and being pivotal in by the operational movement of components connected with the sliding lid with respect to the restoring levers when the sliding lid is closed.

In a known wind deflector device of this kind (DE-OS No. 26 07 816) the wind deflector is mounted pivotal about an axis oriented transversely to the longitudinal axis of the automobile and situated considerably below the vehicle roof and also distant by an appreciable amount from the forward edge of the roof opening. With this arrangement of the pivotal axis, a pivoting out of the wind deflector above the roof surface is indeed possible if the wind deflector and the functional components co-operating with it are appropriately formed. Only the rear region of the wind deflector, however, here projects above the roof surface, whereas a larger, forward zone of the wind deflector is situated in an inclined position below the roof surface. As a consequence of this arrangement of the pivotal axis of the wind deflector, an unbridgeable gap space exists between this deflector and the forward edge of the roof opening when the wind deflector is pivoted out, which space favours the production of air turbulence during travelling. This results in appreciable wind noise. Moreover, the flow resistance, represented by the air resistance value $c_w$, increases in the region of the roof. The known wind deflector device requires furthermore a considerable complication of assembly, because pivot bearing components for the wind deflector and for the restoring levers must be fixed in the roof frame, to which then the functional components must be further pivotally fitted.

The task underlying the present invention is to provide a wind deflector device which substantially reduces the wind noise and the air flow resistance. Furthermore, the invention has the objective of reducing the complication of installation.

The stated task is achieved according to this invention, starting from the initially stated category, in that a pivoting out spring, bearing against the roof frame, acts with prestress on each restoring lever, and that at least one displacement spring is connected with the wind deflector, which (displacement spring) bears with prestress against the forward roof frame in such a manner that the wind deflector, when swung out, can simultaneously be displaced until its forward edge bears against the forward edge of the roof opening.

In the wind deflector device according to this invention, the wind deflector is no longer journalled about a fixed pivoting axis, but pivots with simultaneous displacement of its forward edge forwards and upwards. The space existing between the forward edge of the roof opening and the forward edge of the approximately horizontally lying wind deflector in the at-rest condition of the wind deflector, i.e. with the roof opening closed by the sliding lid, is thereby automatically cancelled as the sliding lid opens, until a flow-favouring connection of the forward edge of the wind deflector to the forward edge of the roof opening is achieved. The wind noise and, of course, also the air flow resistance are thereby substantially reduced, to which also the small angle of opening that is typical of the wind deflector device of this invention also contributes. These advantageous effects are achieved according to the basic concept of the invention by the co-operation between a pivoting-out spring assembly acting upon the restoring levers and a displacement spring assembly acting upon the wind deflector.

Wherever, in the following discussion, mention is made of specific components being supported or fixed to the roof frame or acting upon parts of the roof frame, these wordings shall also include forms of construction in which the supporting, fixing etc. takes place not directly on the roof frame, but on components of the sliding roof construction carried by the roof frame or fixed thereto.

The pivoting out springs are especially effective if they are each formed as a spring arm, which on the one hand bears relatively displaceably against the end of the restoring lever acting upon the wind deflector and on the other hand is fixed to the roof frame. The pivoting out springs thereby act indirectly via the restoring lever ends on the wind deflector, with the result that the latter has firm support during travelling. Advantageously, the arrangement may here be such that the spring arm is the longer leg of a spring clip, the shorter leg of which is fixed to the roof frame. In principle, however, the arrangement may also be such that the restoring levers themselves are constructed as pivoting out springs. For example, the restoring levers may be formed as prestressed leaf springs, thereby eliminating the provision of additional springs for the pivoting out movement.

In pursuance of the concept of this invention, the displacement spring consists of two arms connected together in spring manner and situated in one vertical plane, of which the free end of the one arm is articulated to the wind deflector in the vicinity of its forward edge, whereas the free end of the other arm is fixed resiliently to the forward roof frame. The arm fixed to the roof frame then provides for the displacement of the wind deflector forwards during the outward pivoting movement, whereas the arm articulated at the wind deflector assures the simultaneous displacement of the forward edge of the wind deflector upwards.

An especially simple and effective embodiment of the displacement spring is obtained, if it is a spring clip, the longer leg of which is bent into an acute-angled clasp spring situated in a vertical plane, whereas the shorter leg is fixed to the roof frame. In this form of embodiment the displacement of the wind deflector forwards is effected by the spring turns which are present in a spring clip and which in this case are situated between the shorter leg fixed to the roof frame and the adjacent leg of the clasp spring. The longer leg of the spring clip which is bent to form a clasp spring causes the upward displacement of the forward edge of the wind deflector.

In order to obtain, for the pivoted out and forwardly and upwardly displaced wind deflector, a firm seating during travelling, it is advantageous for two displacement springs to be pivoted and for each displacement spring to be combined with one provided out spring to form a one-piece assembly. The combining into a one-piece spring assembly makes possible a compact, economical form of construction. In this preferred arrangement, it is advantageous from the aspect of easier installation of the spring assembly, if the shorter legs of the two spring clips be connected as one piece with each other, aligned with each other, forming a fixing stirrup. The entire spring assembly can then be fixed to the roof frame by means of the fixing stirrup. A rapid and nevertheless reliable fixing possibility is achieved if the fixing stirrup possesses two mutually opposite indentations, which are snap-engaged with prestress between two opposite hook projections of the roof frame facing towards each other. In this manner the spring assembly can, without the assistance of special tools and solely by pressure upon the spring turns forming part of the two spring clips, be elastically compressed in the region of the fixing stirrup and introduced between the hook projections, against which the indentations of the fixing stirrup engage as soon as the pressure on the spring turns is released.

A contribution to easier assembly is also provided if the restoring levers each engage, by a guide pin mounted on the free end, into the elongated hole situated in a shaped component fixed by snap engagement to the underside of the wind deflector. The shaped component advantageously possesses a downwardly open slit, continuous over substantially its length, and intersecting the elongated hole at right angles, into which slit the end of the pivoting out spring engages to bear against the guide pin of the restoring lever and which, when the wind deflector is swung in, substantially houses the pivoting out spring. The guiding of the effective end of the pivoting out spring in the slit of the shaped component provides for reliable functioning, especially since this guiding is maintained in the entire pivoting and displacement range of the wind deflector.

The articulation of the displacement spring to the shaped component can be effected in a very simple manner by the free end of the displacement spring engaging pivotally with a horizontal bend into the shaped component.

The restoring levers also can be installed in a simple manner if their ends journalled on the roof frame are each bent into an open bearing sleeve, which is snap-engaged onto a bearing pin fixed to the roof frame.

In pursuance of the concept of this invention, a sealing profile is fixed to the forward edge of the wind deflector, the surface of which profile facing towards the forward edge of the roof opening is formed to bear sealingly agaist this roof opening edge. It is of considerable advantage if the sealing profile is shaped at its upper surface to form a gradual and jointlessly smooth transition between the forward edge of the roof opening and the wind deflector when the wind deflector is pivoted out. In this manner a flow separation edge does not occur at the transition point between the forward, fixed edge of the roof and the wind deflector, with the result that the desired reduction in the wind noise and flow resistance is very effectively promoted.

Further details of the invention are explained below with reference to the drawings which illustrate an example of embodiment thereof. The drawings show:

FIG. 1 a cut away plan on the wind deflector device and on the components of the sliding roof structure, with which it is connected, made visible by omitting the sliding lid, FIG. 2 a longitudinal section along II—II in FIG. 1, FIG. 3 a corresponding longitudinal section, but with the sliding lid partly opened and wind deflector fully pivoted out, FIG. 4 a cut away partial view corresponding to arrow IV in FIG. 3, FIG. 5 a perspective view of the spring assembly consisting of pivoting out spring and displacement spring, and FIG. 6 a cut away section along VI—VI in FIG. 1.

In the drawings, only the arrangement in the region of the foward left corner of the sliding roof construction is illustrated (as considered in the direction of travel of the automobile). The right corner region is of opposite hand. In the description below, therefore, the left-side elements visible from the drawings are referred to exclusively.

The forward roof zone 1 of the automobile roof can be seen from FIGS. 2 and 3. The roof opening 2 (FIG. 1) is surrounded at the front and laterally by a roof frame 3, to which all the parts of the sliding roof construction, including the wind deflector device, are indirectly or directly fixed. In the vehicle longitudinal direction, which is shown in FIG. 1 by the travel direction arrow 4, guide rails 5 are fixed laterally to the roof frame, of which only the left-hand guide rail can be seen from the drawings. On the guide rails 5 the sliding lid 6 is slidably guided by forward and rear sliding shoes, of which only the forward, left sliding shoes can be seen from FIG. 1. The sliding shoes 7 are fitted to a forward guide element 8. This guide element 8 is rigidly connected with the corresponding guide element on the right side of the vehicle by a transverse beam 9. The sliding lid 6 is articulated to this transverse beam 9 by forward hinges 10, which make possible a lowering movement of the rear edge of the lid when the sliding lid is pushed beneath the rear, fixed roof surface and, of course, also a pivoting back of the sliding lid into the plane of the roof when the roof is closed. The connection of the hinges 10 with the sliding lid is effected by upper hinge components 11 (FIG. 1).

Of the cable drive apparatus for the sliding lid, which is not a subject of the present invention, only the forward cable guide tubes 12 are illustrated in FIGS. 2 and 3. These guide tubes are covered in the region of the forward roof frame by a cover plate 13, fixed to the roof frame 3. Lateral connecting plates 14 (FIGS. 2, 3) provide the connection between the cable guide and the guide rails. In FIGS. 2 and 3, a screw 15 is shown for fixing the left connecting plate 14 to the left guide rail 5. The rainwater gutter 16 present on the roof frame 3 is shown in FIGS. 2 and 3 solely as an example of the forward roof frame component. All functional parts, including these of the wind deflector device, are situated outside the rainwater gutter 16 and therefore do not come into corrosion contact with the rainwater and wash water, located therein in spite of an edge gap seal 17 pushed onto a peripheral downward flange of the sliding lid 6.

Above the forward part of the roof frame 3 is the wind deflector 18, to the underside of which in the vicinity of each of its two ends, a shaped component 19 oriented in the direction of travel (arrow 4) and preferably injection moulded from plastics material, is fixed by snap engagement with cranked edges 20 and 21 of the wind deflector 18. In the shaped component 19 there is an elongated hole 22 oriented parallel to the principal surface of the wind deflector 18 (FIG. 3), into which hole a guide pin 24 mounted on the free end of a restoring lever 23 slidably engages. The restoring lever 23 is bent with its other end to an open bearing sleeve 25, which is snap-engaged in the manner of a hinge onto a bearing pin 26 formed by rolling in the connecting plate 14.

It can be seen that the restoring lever, articulated in the above described manner, in clockwise pivoting out movements slides upwards with its guide pin 24 in the elongated hole 22 until it bears against the rear end of the elongated hole 22, until the position illustrated in FIG. 3 is reached. Conversely, the guide pin 24 moves towards the other end of the elongated hole when the restoring lever 23 pivots anticlockwise downwards, which is caused by the forward guide element 8 running onto it.

The automatic pivoting out and displacement movement of the wind deflector 18 is caused and controlled by a single-piece spring assembly, which is explained in more detail below with reference to FIG. 5. This spring assembly is composed of two spring clips, connected together and referenced generally 27 and 28, of which the spring clip 27 constitutes the pivoting out spring while the spring clip 28 is the displacement spring.

The longer leg 29 of the spring clip 27 constitutes a spring arm of the pivoting out spring, which co-operates in a manner to be explained with the restoring lever 23. The pivot axis for the spring arm constituted of the leg 29 is defined by the spring turns 30 of the spring clip 27. The shorter leg 31 of the spring clip 27 is aligned with the shorter leg 32 of the spring clip 28 and is connected with this leg by a fixing stirrup 33, also bent from the round wire of the spring. The entire spring assembly 27, 28 is immovably snap-engaged by indentations 34 against hook projections 35 bent out and up from the cover plate 13, as can be seen from FIGS. 1 and 6.

The shorter leg 32 of the spring clip 28 is adjoined by spring turns 36, which define the axis of the pivot bearing for the pivoting out spring formed of the spring clip 28. The longer leg of the spring clip 28, following the spring turns 36 and generally referenced 37, is bent into an acute-angled clasp spring, situated in a vertical plane, the upper arm 38 of which engages with a horizontal bend 39 into a corresponding bearing bore 40 at the forward end of the shaped component 19. The lower arm of the clasp spring constituted of the longer leg 37 of the spring clip 28 bears the reference 41. The arms 38 and 41 are connected together by the apex 42 of the clasp spring. Instead of the apex 42, spring turns in the sense of a further spring clip may also be provided.

The shaped component 19 possesses a slit 43, intersecting the elongated hole 22 perpendicularly and continuing substantially over its entire length, into which slit the longer leg 29, constituting the spring arm, of the spring clip 27 engages with its end, bearing with prestress against the guide pin 24. The outer end 44 of the leg 29 is bent away, so that it can slide along the base of the slit 43.

If the sliding lid 6, starting from the closed position illustrated in FIG. 2, is pushed backwards in opposition to the direction of the arrow 4 in FIG. 1, then the wind deflector 18 initially remains in its substantially horizontal position, the forward guide element 8 sliding over the restoring lever. The outward pivoting movement of the wind deflector 18 commences as soon as the forward guide element 8 has reached a cranked zone 45 of the restoring lever 23. The longer leg 29 of the spring clip 27 loads the guide pin 24 of the restoring lever 23, causing the outward pivoting movement of the wind deflector 18. Simultaneously, however, the forward end of the wind deflector 18 is loaded by the displacement spring constituted of the spring clip 28, the lower arm 41 assuring basically the displacement of the wind deflector 18 forwards, whereas the upper arm 38 substantially causes the displacement of the forward edge of the wind deflector 18 upwards. After completion of the simultaneously occurring pivoting out and displacement movements, the wind deflector 18 adopts the position illustrated in FIGS. 3, in which the restoring lever 23 is fully released from the forward guide element 8. The forward edge of the wind deflector 18 now bears, through the intermediary of a sealing profile 46 pushed onto this forward edge, without a gap against the forward edge of the roof opening. The forward surface 47 (FIG. 2), facing towards the edge of the roof opening, of the sealing profile 46 assures a sealing bearing here. The upper surface 48 of the sealing profile 46 constitutes a jointless transition between the forward roof zone 1 and the wind deflector 18, as indicated in FIG. 3.

In the closure displacement of the sliding lid 6, this lid runs in the last phase of its movement back onto the restoring lever 23, causing the wind deflector 18 to be brought against the force of the spring clips 27 and 28 back into the position illustrated in FIG. 2. The slit 43 in the shaped component 19 here receives the longer leg 29 of the spring clip 27, as shown in FIG. 2.

Since the leg 37 of the spring clip 28 bears against the shaped component 19 from the outside, whereas the leg 29 engages into the slit 43 of the shaped component, the wind deflector is secured against lateral displacements.

The wind deflector device of this invention can be used both-as described-on a sliding roof and also with a sliding-lifting roof.

We claim:

1. In a wind deflector device at an automobile roof comprising a roof opening surrounded by a roof frame, which opening can be closed by a sliding lid guided laterally on guide rails of the roof frame, consisting essentially of a wind deflector disposed pivotally along the forward edge of the roof opening and of two restoring levers, which are each pivotally journalled at one end laterally on the roof frame and engage with the other end into an elongated hole situated on the wind deflector, wherein the wind deflector can be pivoted outwardly by spring force when the sliding lid is opened and can be pivoted inwardly when said sliding lid is moved into the closed position the improvement comprising a pivoting spring, bearing against the roof frame, said spring preloading each said restoring lever, at least one displacement spring being operatively connected to said wind deflector, said displacement spring applying a preloading force against the forward portion of said roof frame whereby said wind deflector will swing out and be displaced simultaneously until the forward edge of said wind deflector bears against the forward edge of the opening in said roof, said pivoting springs being each formed as a spring arm, displaceably bearing at one end against said the other end of said restoring lever and fixed at its other end to said roof frame.

2. Device according to claim 1, characterized in that the pivoting out springs are each formed as a spring arm (29), which at the one end bears relatively displaceably against the end of the restoring lever (23) acting on the wind deflector (18) and at the other end is fixed to the roof frame (3).

3. Device according to claim 1, wherein said spring arm is the longer leg of a spring clip, the shorter leg of which is fixed to the roof frame.

4. Device according to claim 1, wherein said restoring levers themselves are constructed as pivoting out springs.

5. Wind deflector device according to claim 1, wherein said displacement spring consists of two arms, resiliently connected to each other and situated in one vertical plane, of which the free end of the one arms is articulated to the wind deflector in the vicinity of its forward edge, whereas the free end of the other arms is resiliently fixed to the forward roof frame.

6. Wind deflector device according to claim 1 wherein said displacement spring is a spring clip, the longer leg of which is bent into an acute-angled clasp spring situated in a vertical plane, whereas its shorter leg is fixed to the roof frame.

7. Device according to claim 1 wherein said two displacement srings are provided and that each displacement spring is combined with one pivoting out spring into a single-piece spring assembly.

8. Device according to claim 3 wherein said shorter legs of the two spring clips are connected together as one piece aligned with each other forming a fixing stirrup.

9. Device according to claim 8, wherein said fixing stirrup comprises two indentations opposite to each other, which are snap-engaged with prestress between two opposite hook projections, pointing towards each other, of the roof frame.

10. Device according to claim 1 wherein said restoring levers each engage with a guide pin mounted on the free end into the elongated hole situated in a shaped component fixed by snap engagement to the underside of the wind deflector.

11. Device according to claim 10, wherein said shaped component possesses a downwardly open slit, continuous substantially over its length and perpendicularly intersecting the elongated hole, into which slit the end of the pivoting out spring engages to bear against the guide pin of the restoring lever and which, when the wind deflector is swung in, basically receives the pivoting out spring.

12. Device according to claim 10 wherein said free end of the displacement spring engages pivotally with a horizontal bent in the shaped component.

13. Device according to claim 10 wherein said ends of the restoring levers journalled on the roof frame are each bent into an open bearing sleeve, which is snap-engaged onto a bearing journal fixed to the roof frame.

14. Device according to claim 1 wherein a sealing profile is fixed to the front edge of the wind deflector, the surface of which facing towards the forward edge of the roof opening is formed to bear sealingly against this roof opening edge.

15. Device according to claim 14, wherein said sealing profile is shaped at its upper surface for forming a gradual and jointlessly smooth transition between the forward edge of the roof opening and the wind deflector when the wind deflector is swung out.

* * * * *